(12) United States Patent
Meyer et al.

(10) Patent No.: US 6,691,507 B1
(45) Date of Patent: Feb. 17, 2004

(54) CLOSED-LOOP TEMPERATURE CONTROL FOR AN EMISSION CONTROL DEVICE

(75) Inventors: Garth Michael Meyer, Dearborn, MI (US); Joseph Richard Asik, Bloomfield Hills, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 09/690,106

(22) Filed: Oct. 16, 2000

(51) Int. Cl.[7] .................................................. F01N 3/00
(52) U.S. Cl. .............................. 60/285; 60/274; 60/300
(58) Field of Search .......................... 60/274, 276, 277, 60/285, 286, 301, 284, 300

(56) References Cited

U.S. PATENT DOCUMENTS

| | | |
|---|---|---|
| 3,696,618 A | 10/1972 | Boyd et al. |
| 3,969,932 A | 7/1976 | Rieger et al. |
| 4,033,122 A | 7/1977 | Masaki et al. |
| 4,036,014 A | 7/1977 | Ariga |
| 4,178,883 A | 12/1979 | Herth |
| 4,251,989 A | 2/1981 | Norimatsu et al. |
| 4,622,809 A | 11/1986 | Abthoff et al. |
| 4,677,955 A | 7/1987 | Takao |
| 4,854,123 A | 8/1989 | Inoue et al. |
| 4,883,973 A | 11/1989 | Lakey et al. |
| 4,884,066 A | 11/1989 | Miyata et al. |
| 4,913,122 A | 4/1990 | Uchida et al. |
| 4,953,351 A * | 9/1990 | Motz et al. .................. 60/285 |
| 4,964,272 A | 10/1990 | Kayanuma |
| 5,009,210 A | 4/1991 | Nakagawa et al. |
| 5,088,281 A | 2/1992 | Izutani et al. |
| 5,097,700 A | 3/1992 | Nakane |
| 5,165,230 A | 11/1992 | Kayanuma et al. |
| 5,174,111 A | 12/1992 | Nomura et al. |
| 5,189,876 A | 3/1993 | Hirota et al. |
| 5,201,802 A | 4/1993 | Hirota et al. |
| 5,209,061 A | 5/1993 | Takeshima et al. |
| 5,211,011 A * | 5/1993 | Nishikawa et al. .......... 60/284 |
| 5,222,471 A | 6/1993 | Stueven |
| 5,233,830 A | 8/1993 | Takeshima et al. |
| 5,267,439 A | 12/1993 | Raff et al. |
| 5,270,024 A | 12/1993 | Kasahara et al. |

(List continued on next page.)

FOREIGN PATENT DOCUMENTS

| | | |
|---|---|---|
| DE | 196 07 151 C1 | 7/1997 |
| EP | 0 351 197 A2 | 1/1990 |
| EP | 0 444 783 A1 | 9/1991 |

(List continued on next page.)

OTHER PUBLICATIONS

Christopher D. De Boer et al., "Engineered Control Strategies for Improved Catalytic Control of $NO_x$ in Lean Burn Applications", SAE 881595, Oct. 10–13, 1988.
W.H. Holl, "Air Fuel Control to Reduce Emissions I. Engine–Emissions Relationships", SAE 800051, Feb. 25–29–1980.

(List continued on next page.)

*Primary Examiner*—Thomas Denion
*Assistant Examiner*—Tu M. Nguyen
(74) *Attorney, Agent, or Firm*—Allan J. Lippa; Kolisch Hartwell, P.C.

(57) ABSTRACT

A system and method are provided for closed-loop monitoring of temperature within a vehicle emission control device to control air-fuel ratio (AFR) and corresponding production of exotherm to accurately maintain a desired temperature range. A temperature sensor is positioned within the emission control device to provide a direct measurement of temperature within the device. Inlet temperature can be either directly measured or estimated using a temperature model. Actual temperature within the device is estimated as a function of the inlet and measured temperatures. The estimated actual temperature is used to modify the AFR in the exhaust gases flowing through the emission control device.

15 Claims, 7 Drawing Sheets

U.S. PATENT DOCUMENTS

| | | | |
|---|---|---|---|
| 5,272,871 A | 12/1993 | Oshima et al. | |
| 5,325,664 A | 7/1994 | Seki et al. | |
| 5,331,809 A | 7/1994 | Takeshima et al. | |
| 5,335,538 A | 8/1994 | Blischke et al. | |
| 5,357,750 A | 10/1994 | Ito et al. | |
| 5,377,484 A | 1/1995 | Shimizu | |
| 5,402,641 A | 4/1995 | Katoh et al. | |
| 5,410,873 A | 5/1995 | Tashiro et al. | |
| 5,412,945 A | 5/1995 | Katoh et al. | |
| 5,412,946 A | 5/1995 | Oshima et al. | |
| 5,414,994 A | 5/1995 | Cullen et al. | |
| 5,415,139 A | 5/1995 | Aoto et al. | |
| 5,419,122 A | 5/1995 | Tabe et al. | |
| 5,423,181 A | 6/1995 | Katoh et al. | |
| 5,426,934 A | 6/1995 | Hunt et al. | |
| 5,433,074 A | 7/1995 | Seto et al. | |
| 5,437,153 A | 8/1995 | Takeshima et al. | |
| 5,448,887 A | 9/1995 | Takeshima | |
| 5,450,722 A | 9/1995 | Takeshima et al. | |
| 5,452,576 A | 9/1995 | Hamburg et al. | |
| 5,472,673 A | 12/1995 | Goto et al. | |
| 5,473,887 A | 12/1995 | Takeshima et al. | |
| 5,473,890 A | 12/1995 | Takeshima et al. | |
| 5,483,795 A | 1/1996 | Katoh et al. | |
| 5,531,972 A | 7/1996 | Rudy | |
| 5,544,482 A | 8/1996 | Matsumoto et al. | |
| 5,551,231 A | 9/1996 | Tanaka et al. | |
| 5,554,269 A | 9/1996 | Joseph et al. | |
| 5,577,382 A | 11/1996 | Kihara et al. | |
| 5,595,060 A | 1/1997 | Togai et al. | |
| 5,598,703 A | 2/1997 | Hamburg et al. | |
| 5,617,722 A | 4/1997 | Takaku | |
| 5,622,047 A | 4/1997 | Yamashita et al. | |
| 5,626,014 A | 5/1997 | Hepburn et al. | |
| 5,626,117 A | 5/1997 | Wright et al. | |
| 5,655,363 A | 8/1997 | Ito et al. | |
| 5,657,625 A | 8/1997 | Koga et al. | |
| 5,693,877 A | 12/1997 | Ohsuga et al. | |
| 5,713,199 A | 2/1998 | Takeshima et al. | |
| 5,715,679 A | 2/1998 | Asanuma et al. | |
| 5,722,236 A | 3/1998 | Cullen et al. | |
| 5,724,808 A | 3/1998 | Ito et al. | |
| 5,729,971 A | 3/1998 | Matsuno et al. | |
| 5,732,554 A | 3/1998 | Sasaki et al. | |
| 5,735,119 A | 4/1998 | Asanuma et al. | |
| 5,740,669 A | 4/1998 | Kinugasa et al. | |
| 5,743,084 A | 4/1998 | Hepburn | |
| 5,746,049 A | 5/1998 | Cullen et al. | |
| 5,746,052 A | 5/1998 | Kinugasa et al. | |
| 5,752,492 A | 5/1998 | Kato et al. | |
| 5,758,493 A | 6/1998 | Asik et al. | |
| 5,771,685 A | 6/1998 | Hepburn | |
| 5,771,686 A | 6/1998 | Pischinger et al. | |
| 5,778,666 A | 7/1998 | Cullen et al. | |
| 5,792,436 A | 8/1998 | Feeley et al. | |
| 5,802,843 A | 9/1998 | Kurihara et al. | |
| 5,803,048 A | 9/1998 | Yano et al. | |
| 5,831,267 A | 11/1998 | Jack et al. | |
| 5,832,722 A | 11/1998 | Cullen et al. | |
| 5,842,339 A | 12/1998 | Bush et al. | |
| 5,842,340 A | 12/1998 | Bush et al. | |
| 5,865,027 A | 2/1999 | Hanafusa et al. | |
| 5,877,413 A | 3/1999 | Hamburg et al. | |
| 5,894,725 A | 4/1999 | Cullen et al. | |
| 5,910,096 A * | 6/1999 | Hepburn et al. | 60/286 |
| 5,929,320 A | 7/1999 | Yoo | |
| 5,938,715 A | 8/1999 | Zhang et al. | |
| 5,956,941 A * | 9/1999 | Cullen et al. | 60/274 |
| 5,966,930 A | 10/1999 | Hatano et al. | |
| 5,970,707 A | 10/1999 | Sawada et al. | |
| 5,974,788 A | 11/1999 | Hepburn et al. | |
| 5,974,791 A | 11/1999 | Hirota et al. | |
| 5,974,793 A | 11/1999 | Kinugasa et al. | |
| 5,974,794 A | 11/1999 | Gotoh et al. | |
| 5,979,161 A | 11/1999 | Hanafusa et al. | |
| 5,983,627 A | 11/1999 | Asik | |
| 5,992,142 A | 11/1999 | Pott | |
| 5,996,338 A | 12/1999 | Hirota | |
| 6,003,308 A | 12/1999 | Tsutsumi et al. | |
| 6,012,428 A | 1/2000 | Yano et al. | |
| 6,014,859 A | 1/2000 | Yoshizaki et al. | |
| 6,023,929 A | 2/2000 | Ma | |
| 6,026,640 A | 2/2000 | Kato et al. | |
| 6,058,700 A | 5/2000 | Yamashita et al. | |
| 6,073,440 A | 6/2000 | Douta et al. | |
| 6,092,369 A | 7/2000 | Hosogai et al. | |
| 6,105,365 A | 8/2000 | Deeba et al. | |
| 6,119,449 A | 9/2000 | Kohler | |
| 6,128,899 A | 10/2000 | Oono et al. | |
| 6,134,883 A | 10/2000 | Kato et al. | |
| 6,138,453 A | 10/2000 | Sawada et al. | |
| 6,145,302 A * | 11/2000 | Zhang et al. | 60/285 |
| 6,145,305 A | 11/2000 | Itou et al. | |
| 6,148,612 A | 11/2000 | Yamashita et al. | |
| 6,199,373 B1 * | 3/2001 | Hepburn et al. | 60/285 |
| 6,202,406 B1 * | 3/2001 | Griffin et al. | 60/285 |
| 6,212,884 B1 * | 4/2001 | Ohuchi et al. | 60/285 |
| 6,233,923 B1 * | 5/2001 | Itou et al. | 60/277 |
| 6,237,330 B1 * | 5/2001 | Takahashi et al. | 60/285 |
| 6,266,957 B1 * | 7/2001 | Nozawa et al. | 60/285 |
| 6,345,496 B1 * | 2/2002 | Fuwa et al. | 60/274 |

FOREIGN PATENT DOCUMENTS

| | | |
|---|---|---|
| EP | 0 503 882 A1 | 9/1992 |
| EP | 0 580 389 A1 | 1/1994 |
| JP | 62-97630 | 5/1987 |
| JP | 62-117620 | 5/1987 |
| JP | 64-53042 | 3/1989 |
| JP | 2-30915 | 2/1990 |
| JP | 2-33408 | 2/1990 |
| JP | 2-207159 | 8/1990 |
| JP | 3-135147 | 6/1991 |
| JP | 5-26080 | 2/1993 |
| JP | 5-106493 | 4/1993 |
| JP | 5-106494 | 4/1993 |
| JP | 6-58139 | 3/1994 |
| JP | 6-264787 | 9/1994 |
| JP | 7-97941 | 4/1995 |
| WO | WO 98/27322 | 6/1998 |

OTHER PUBLICATIONS

Y. Kaneko et al., "Effect of Air–Fuel Ratio Modulation on Conversion Efficiency of Three–Way Catalysts", Inter–Industry Emission Control Program 2 (IIEC–2) Progress Report No. 4, SAE Technical Paper No. 780607, Jun. 5–9, 1978, pp. 119–127.

Allen H. Meitzler, "Application of Exhaust–Gas–Oxygen Sensors to the Study of Storage Effects in Automotive Three–Way Catalysts", SAE 800019, Feb. 25–29, 1980.

Joe Theis et al., "An Air/Fuel Algorithm To Improve The $NO_x$ Conversion Of Copper–Based Catalysts", SAE Technical Paper No. 922251, Oct. 19–22, 1992, pp. 77–89.

Wei–Ming Wang, "Air–Fuel Control to Reduce Emissions, II. Engine–Catalyst Characterization Under Cyclic Conditions", SAE 800052, Feb. 25–29, 1980.

Toshiaki Yamamoto et al., "Dynamic Behavior Analysis of Three–Way Catalytic Reaction", JSAE 882072–882166.

* cited by examiner

Fig. 6b

CLOSED-LOOP TEMPERATURE CONTROL FOR AN EMISSION CONTROL DEVICE

TECHNICAL FIELD

The present invention relates to arrangements for restoring storage capacity of a vehicle emission control device.

BACKGROUND ART

Generally, lean burn engines in vehicles generate tailpipe $NO_x$ when operating in a normal lean burn cycle, i.e., operating the engine with an air-fuel ratio (AFR) leaner than stoichiometric. Vehicle exhaust treatment systems utilize a three-way catalyst (TWC), referred to as an emission control device or lean $No_x$ trap, positioned in an exhaust passage to store and release constituent gases such as $NO_x$ depending on engine operating conditions.

More specifically, storage capacity of such emission control devices is limited. As a result, stored gas is released by periodically operating the engine in a rich AFR cycle. In addition, various factors such as the type of fuel and overall aging of the emission control device act to reduce original storage capacity.

Generally, storage capacity of the emission control device can be potentially restored by periodically operating the engine in such a manner as to raise the temperature of the exhaust to a predetermined temperature range. As part of this process, the AFR must be controlled to properly sustain the desired temperature range. As a consequence, a need exists for an arrangement capable of accurately controlling temperature within an emission control device when attempting to restore storage capacity.

DISCLOSURE OF THE INVENTION

Therefore, it is an object of the present invention to provide a temperature control system and method which utilizes a closed-loop arrangement to dynamically generate an estimate for temperature within an emission control device to produce an AFR correction factor which will maintain the temperature within a desired range.

In accordance with a first aspect of the present invention, a system is provided for controlling the temperature within an emission control device, the emission control device having a catalyst bed for reducing emission of a constituent gas in an exhaust system of an engine, wherein the system includes a first temperature sensor connected to the emission control device to generate an output representative of temperature within the emission control device, and a control processor coupled to a fuel control subsystem and arranged to estimate actual temperature within the catalyst bed based on the output of the first temperature sensor. The control processor is further arranged to compare the estimated emission control device temperature with a desired temperature, and control the air-fuel ratio as a function of the comparison to control the temperature within the emission control device.

In accordance with a second aspect of the present invention, a method is provided for controlling the temperature within an emission control device, the emission control device having a catalyst bed for reducing emission of a constituent gas in an exhaust system of an engine, wherein the method includes measuring the temperature of exhaust gases flowing through the emission control device, and determining an estimate of actual temperature at the catalyst bed based on the output of the temperature measurement.

The estimated emission control device temperature is then compared with a desired temperature, and an air-fuel ratio of the exhaust gases is modified based on the temperature comparison to control the temperature within the emission control device.

In a preferred embodiment, the first temperature sensor is positioned at a midbrick location in the emission control device to provide a direct and accurate measurement of temperature within the device. In addition, the inlet temperature can be either directly measured or estimated from a temperature model as a function of monitored engine operating conditions.

Thus, because the present invention provides continual and accurate monitoring of the temperature in the emission control device along with corresponding AFR adjustments, the present invention assures accurate temperature control to minimize the possibility of damage to the emission control device due to excessive lean AFR when the device is hot, while also maximizing the potential for restoring storage capacity with a rich AFR when the trap is at a desired temperature. Accordingly, improvement is attained in the efficiency of the overall operation of the lean burn exhaust treatment system.

The above object and other objects, features, and advantages of the present invention are readily apparent from the following detailed description of the best mode for carrying out the invention when taken in connection with the accompanying drawings.

BEST MODE FOR CARRYING OUT THE INVENTION

Figure 1:
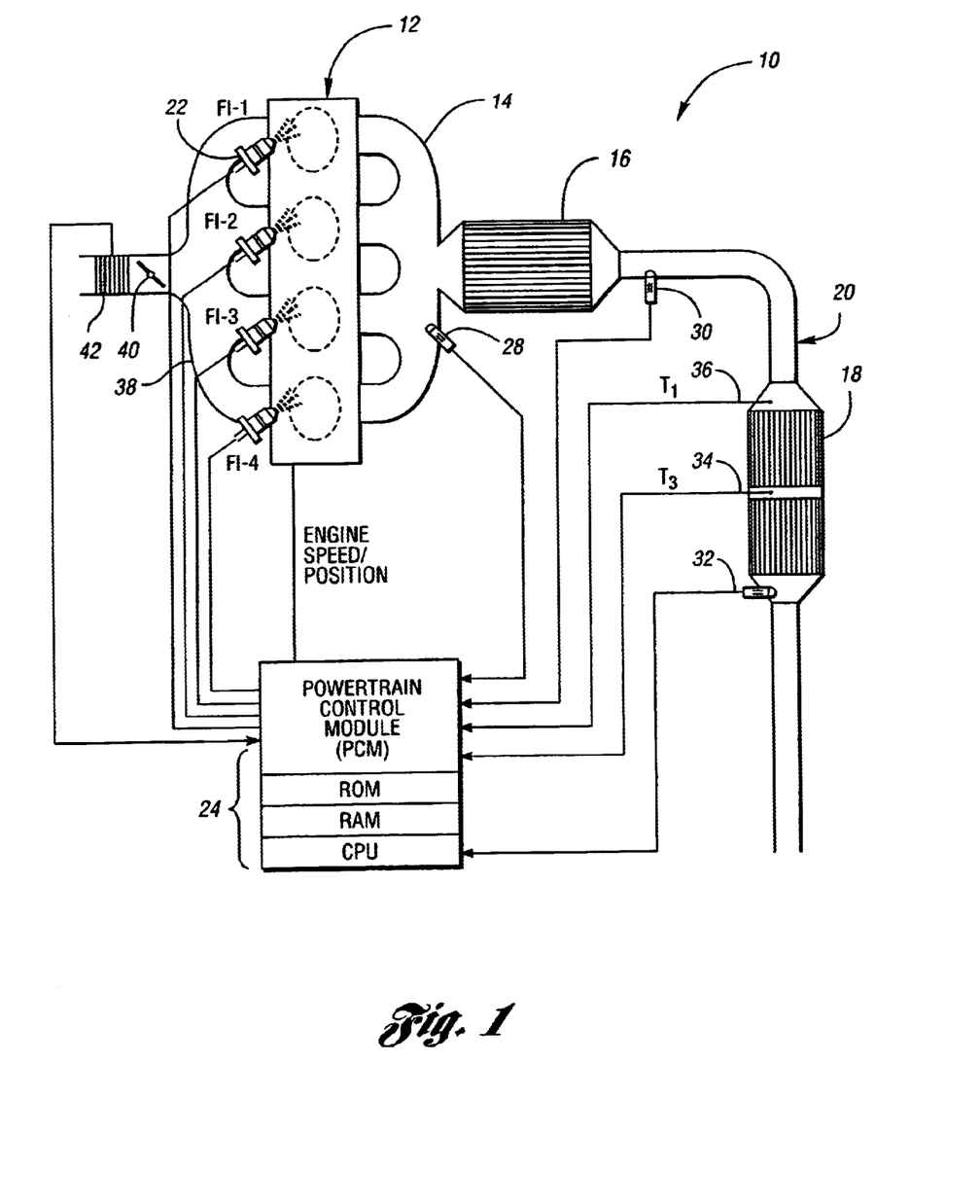
FIG. 1 is a block diagram of an engine exhaust and after-treatment system for a lean burn engine in accordance with one embodiment of the present invention.

FIG. 1 provides a block diagram illustrating a lean burn engine exhaust and after-treatment system 10 in accordance with the present invention. System 10 includes an engine 12 having a conventional exhaust manifold 14 coupled thereto, and at least one emission control device 18 positioned within an exhaust passage. A second emission control device 16 can also be coupled to the exhaust system. While a four cylinder engine is shown, such an engine configuration is not to be construed as limiting.

At least one fuel injector 22 delivers fuel to the engine 12 during operation thereof. While four such injectors are shown, this too is not to be construed as limiting. A powertrain control module (PCM) 24 includes a CPU, RAM, and ROM programmed to control operation of the fuel injector(s) 22 in accordance with any conventional fuel control algorithm strategy such as proportional integral (PI) with jump and ramp, proportional integral differential (PID), or equivalent thereof.

A first oxygen sensor 28 is coupled to the exhaust manifold 14, and a second oxygen sensor 30 is coupled to a section of exhaust pipe 20 upstream of emission control device 18. Sensors 28 and 30 provide signals to PCM 24 for controlling the AFR of the engine exhaust during normal operation of engine 12, such as during the stoichiometric phase of a lean burn operation. In addition, these sensors are also typically used in conjunction with on-board diagnostics (OBD) relating to emission control device efficiency. As discussed in more detail below, the closed-loop temperature and AFR control system of the present invention further includes a third oxygen sensor 32 coupled to emission control device 18 for controlling the AFR during gas storing and releasing cycles. Sensors 28, 30, and 32 can be implemented in any suitable form, such as a heated exhaust gas oxygen (HEGO) type sensor, an exhaust gas oxygen (EGO) type sensor, or a linear type sensor such as a universal exhaust gas oxygen (UEGO) sensor.

In addition to the oxygen senors, a temperature sensor 34 is positioned within emission control device 18 to provide a signal representative of a temperature $T_2$ within the device. Senor 34 is preferably positioned in the middle of the emission control device, i.e., a "midbrick" location, to improve measurement accuracy for PCM 24. A second temperature sensor 36 can be coupled to the inlet of emission control device 18 so as to provide a measured value for inlet temperature $T_1$ as described below in connection with the embodiment of FIG. 2. The temperature sensors can be implemented as platinum resistive temperature devices (RTD). Air is input to the engine through an intake manifold 38 under control of a throttle 40. An airmeter 42 provides a signal to PCM 24 as is well understood to one of ordinary skill in the art.

In addition to the single pipe exhaust design shown in FIG. 1, the present invention is equally applicable to split exhaust type systems. More specifically, a split exhaust design utilizes two separate exhaust manifolds that are merged together into a single exhaust pipe for input into emission control device 18. Each exhaust leg includes a separate exhaust manifold oxygen sensor for non-lean burn operation.

As described above, constituent gas, such as $NO_x$, is stored in the emission control during a lean AFR cycle, and is released from the emission control device during a rich or stoichiometric AFR cycle. A lean cycle is typically 60 seconds in length, while a rich cycle is typically 1–2 seconds in length. $T_1$ corresponds to an emission control device input temperature while $T_2$ corresponds to a temperature at the center of the device. $T_3$ is used to designate the output of midbrick temperature sensor 34. The PCM accepts inputs from the airmeter, engine speed/position, oxygen sensors and temperature sensor(s) as well as other inputs not described. The PCM calculates the desired fuel injection quantity and timing for the various engine operating modes.

Periodically, an attempt is made to restore storage capacity of the emission control device. More specifically, the PCM is arranged to maintain a slightly rich AFR, such as a value equal to 0.97 stoichiometry, after the midbed temperature has been raised to a predetermined temperature or temperature range for a predetermined period of time, such as approximately four minutes. As described below, one embodiment of the present invention uses a sequential AFR modulation control arrangement based on alternating sequences of rich and lean fuel pulses, to produce an exotherm to raise the temperature within the emission control device. However, the present invention can be tailored for use with other AFR control arrangements such as employed in a split exhaust pipe configuration described in commonly-owned U.S. Pat. No. 5,758,493. In either arrangement, the PCM is arranged to maintain the overall AFR of the exhaust gases at a slightly rich level to effect restoration of storage capacity. For example, such restoration results in release or "desorbing" of $SO_x$ stored in the emission control device.

Figure 2:
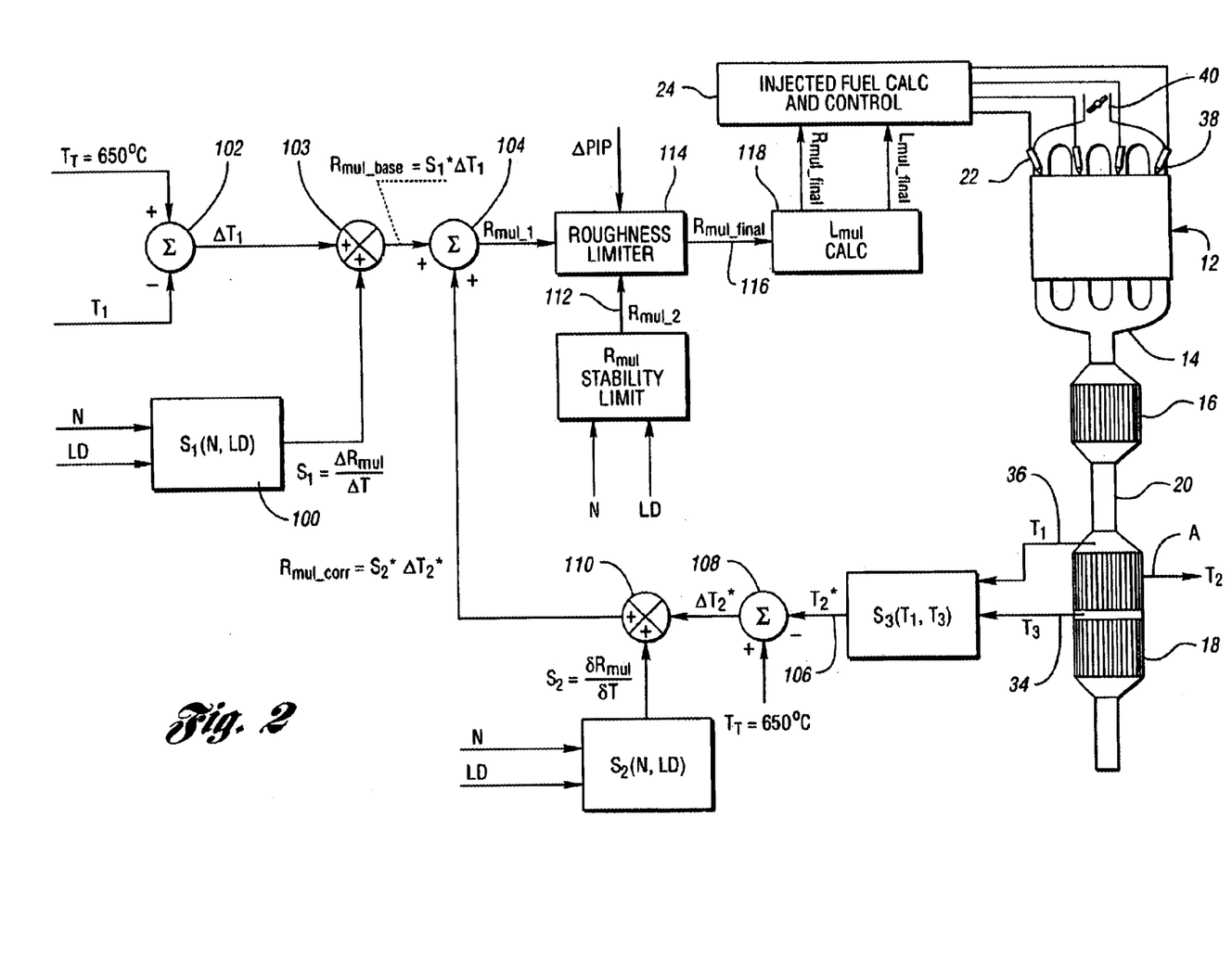
FIG. 2 is a block diagram illustrating closed-loop control of temperature of an emission control device during an attempt to restore storage capacity of the emission control device, such as a desulfation process, using a direct inlet temperature measurement.
Figure 3:
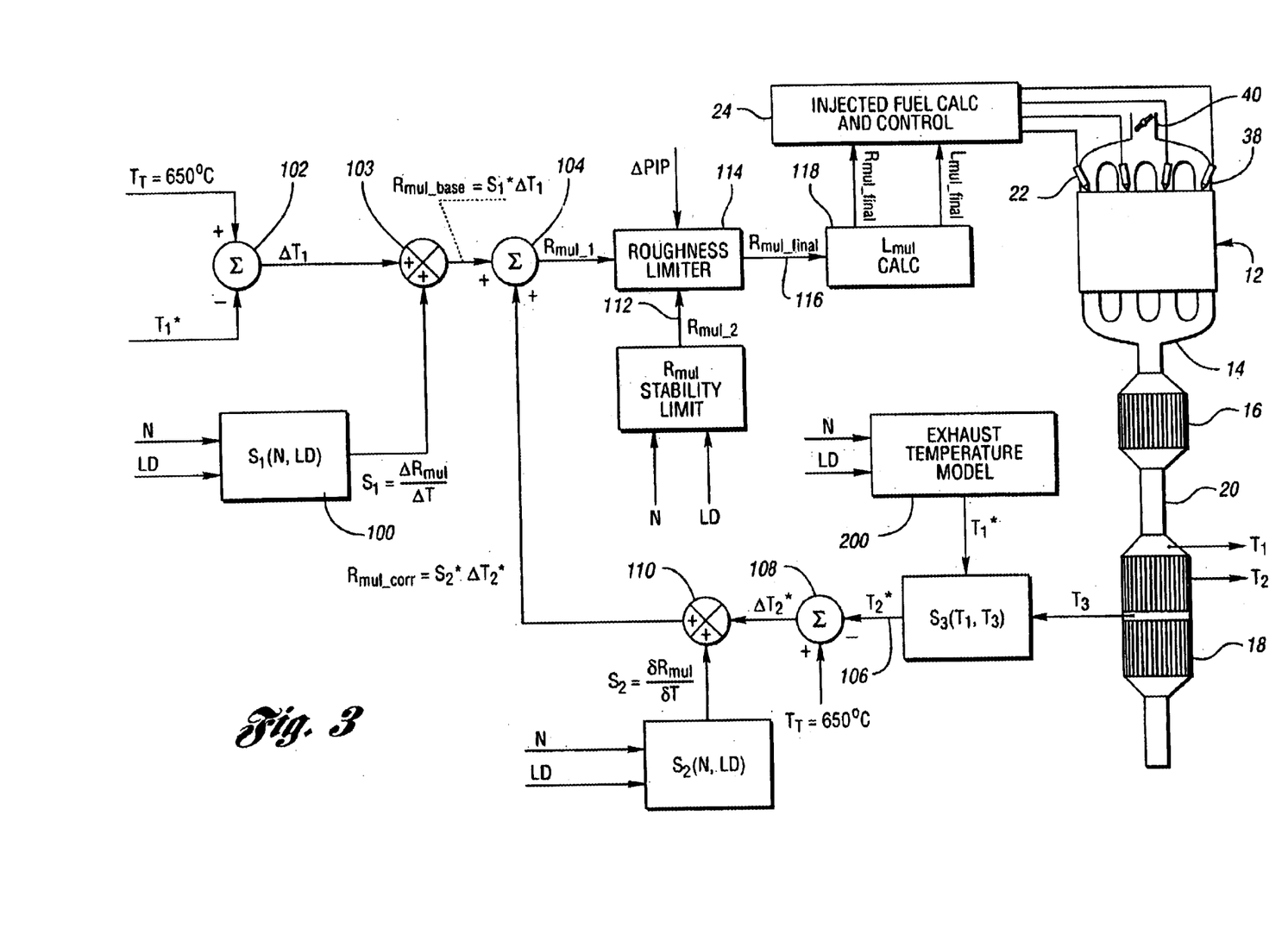
FIG. 3 is a block diagram illustrating closed-loop control of temperature of an emission control device during an attempt to restore storage capacity of the emission control device, such as a desulfation process, using a model based estimate of inlet temperature.

FIGS. 2 and 3 illustrate two embodiments respectively for closed-loop control of the temperature within the emission control device during such capacity restoration process. The two figures are similar except that in FIG. 2 sensor 36 provides a direct measurement of temperature $T_1$, while in FIG. 3, an exhaust temperature model provides a model based estimate $T_1^*$ for actual temperature $T_1$. To control the emission control device temperature, a rich fuel pulse multiplier $R_{mul}$, and a lean fuel pulse multiplier $L_{mul}$ are adjusted as needed to produce the desired temperature.

Figure 4A:
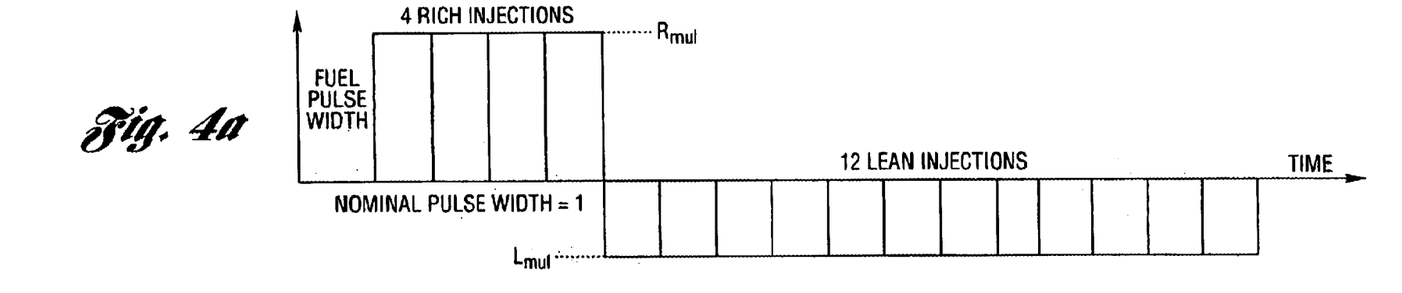
FIGS. 4a–c are graphs comparing asymmetric AFR modulation, spark advance, and torque during desulfation.
Figures 4B, 4C:
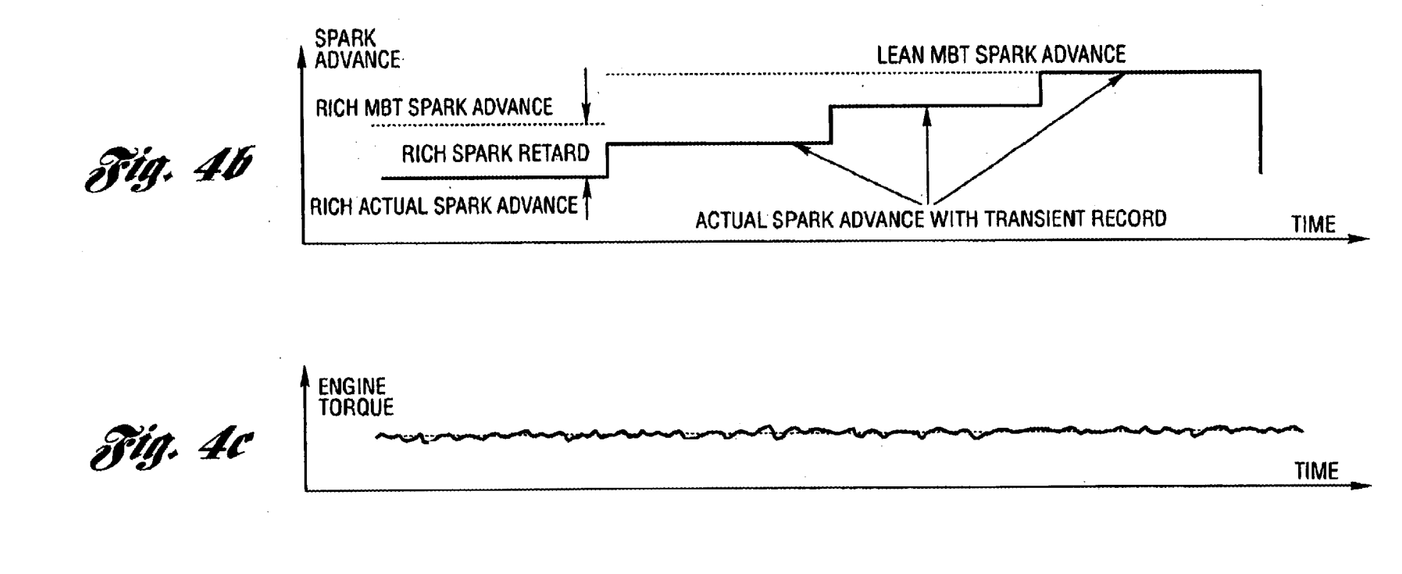

FIGS. 4a–c show the relationship of $R_{mul}$ and $L_{mul}$ on a time axis for an exemplary AFR control arrangement. Individual injection events are shown in accordance with a sequence of four rich events followed by twelve lean events to provide a commensurate relationship to the number of engine cylinders for a four-cylinder engine described in connection with FIG. 1. Such an AFR control arrangement is important for the transient spark compensation described below. FIGS. 4a–c show one complete period which is then repeated continuously during the capacity restoration event. Increasing $R_{mul}$ and decreasing $L_{mul}$ increases the emission control device temperature. Asymmetric modulation, e.g., $R_{mul}=3*(1-L_{mul})$, is preferably applied to minimize any excessive lean AFR excursion and possible misfire.

Referring now to FIG. 2, an initial value is obtained at block 100 from a lookup table or function $S_1$ as a function of engine speed N and load LD. $S_1(N, LD)$ represents a coarse sensitivity function that generates $R_{mul\_base}$ for a given temperature error $\Delta T_1$. The temperature error $\Delta T_1$ is calculated at block 102 based on the difference between a desired target temperature $T_T$ (typically about 650° C.) and $T_1$. A base $R_{mul}$ is generated at block 103 by multiplying $S_1$ by $\Delta T_1$. The base $R_{mul}$ is modified at block 104 by a correction factor $R_{mul\_corr}$ to obtain a value $R_{mul\_1}$.

In accordance with the present invention, $R_{mul\_corr}$ is determined using a closed-loop feedback of inlet temperature $T_1$ and the measured midbrick temperature $T_3$. More specifically, actual peak emission control device temperature $T_2$ typically occurs near the engine side of the device as graphically represented by arrow A. However, since the location of $T_2$ changes with engine airflow and values of $R_{mul}$ and $L_{mul}$, it is not generally feasible to provide a direct measurement of $T_2$. In addition, locating a temperature sensor within a catalyst brick structure is generally not recommended from a manufacturing and durability viewpoint. Thus, $R_{mul\_corr}$ is determined by utilizing a subroutine $S_3$ to generate an estimated peak temperature $T_2^*$ at block 106 based on the values $T_1$ and $T_3$. Subroutine $S_3(T_1, T_3)$ of the present invention is arranged to estimate a present value of $T_2=T_2^*$ based on the present and past values of $T_1$ and $T_3$.

In other words, $S_3(T_1,T_3)$ functions as a dynamic temperature estimator. A more detailed description of the dynamic temperature estimator $S_3$ is provided below in connection with FIGS. 6a and 6b.

The estimated peak temperature $T_2^*$ is compared with the target temperature $T_T$ at block 108 to generate a temperature error $\Delta T_2^*$. A fine sensitivity function subroutine $S_2(N, LD)$ is arranged to generate a value $S_2=\delta R_{mul}/\delta T$ as a function of engine speed N and load LD. $S_2$ is multiplied by $\Delta T_2^*$ at block 110 to generate the value for $R_{mul\_corr}$.

The value $R_{mul\_1}$ represents an unlimited corrected value for $R_{mul}$. To prevent misfires and engine roughness, $R_{mul}$ is subsequently limited by one of two subroutines. The first subroutine generates a limited value $R_{mul\_2}$ at block 112 by using N and LD as inputs to a stored lookup table generated by engine mapping and stability analysis. The second subroutine is performed at block 114 by an engine roughness limiter as a function of a measured time $\Delta$PIP for a predetermined engine operating event. The roughness limiter is arranged to perform statistical and engineering compensations on a stored file of historical $\Delta$PIPs to determine a standard deviation and related engine roughness parameters. $R_{mul\_1}$ is limited when the engine roughness parameters exceed a given threshold.

An evaluation can be performed to determine the subroutine output which is best likely to limit engine roughness. The selected subroutine output is used at block 116 as the final value for $R_{mul}$, i.e., $R_{mul\_final}$. A final $L_{mul}$ or $L_{mul\_final}$ is then determined at block 118 based on the selected modulation pattern, such as shown in FIG. 4a as having four rich cylinder injections and twelve lean cylinder injections per modulation period. In this case, $4*(R_{mul\_final}-1)=12*(1-L_{mul\_final})$, which is then restated to produce $L_{mul\_final}=(4-R_{mul\_final})/3$. The final values of $R_{mul}$ and $L_{mul}$ are then provided as inputs to the PCM. The latter modulates the base fuel injected pulsewidth with these values.

As noted above, FIG. 3 shows a control system essentially identical to FIG. 2 except that an exhaust temperature model is used as indicated at block 200 to generate an estimate $T_1^*$ for actual emission control device inlet temperature $T_1$. Thus, $T_1^*$ and $T_3$ are provided as inputs to subroutine $S_3(T_1, T_3)$. In addition, $T_1^*$ is used at block 102 to generate the value for $\Delta T_1$. A suitable exhaust temperature model arrangement is disclosed in commonly-owned U.S. Pat. No. 5,414,994, and herein incorporated by reference. The exhaust temperature model is arranged to generate $T_1^*$ as a function of engine speed N, engine load LD, EGR, spark advance, and engine temperature, and can be calibrated to estimate exhaust temperature at a desired location in the exhaust system. $T_2^*$ is also compared to the target temperature $T_T$ at block 108.

Figure 5:
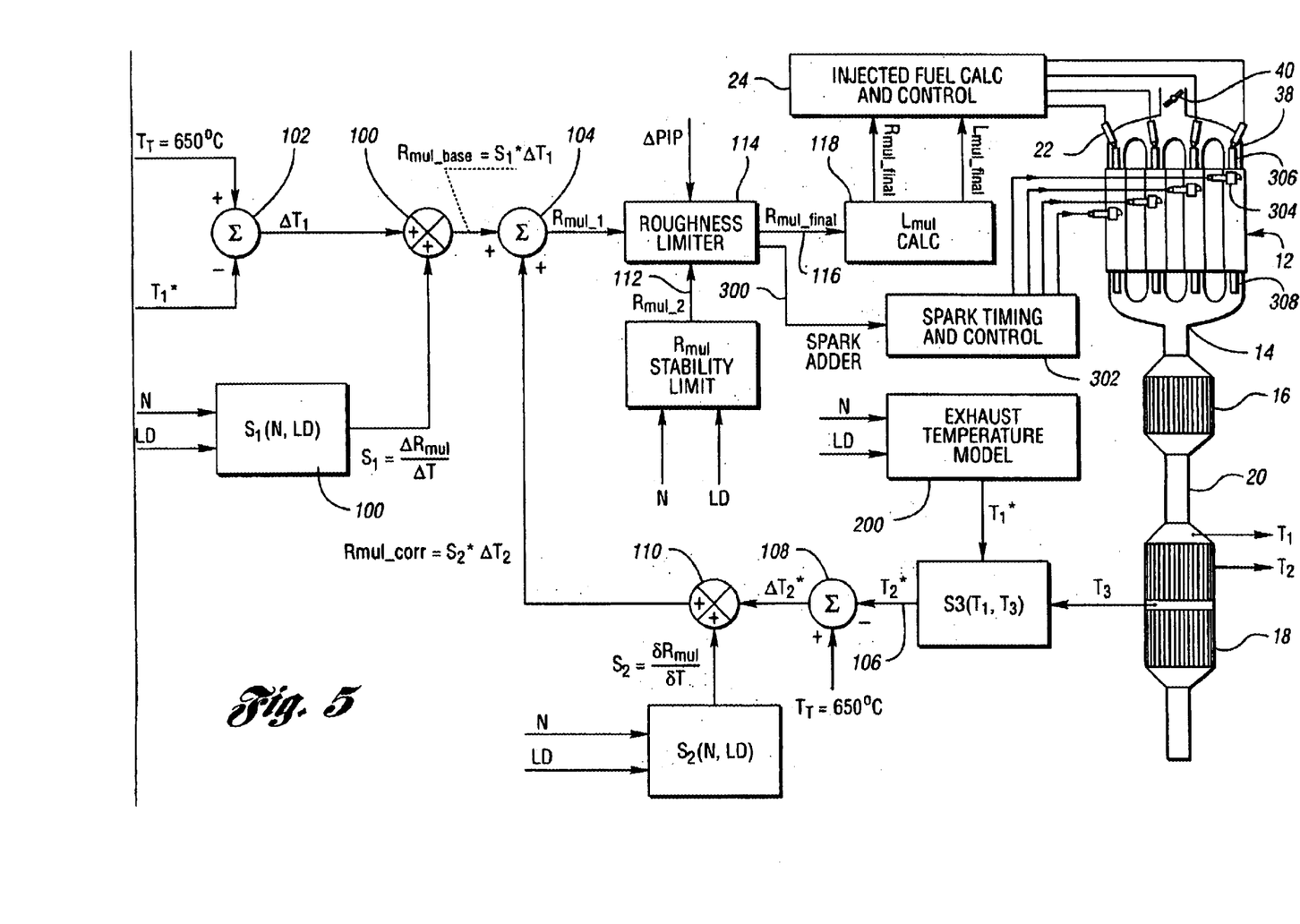
FIG. 5 is a block diagram illustrating closed-loop control of temperature of an emission control device during an attempt to restore storage capacity of the emission control device, such as a desulfation process, in accordance with another embodiment using feedback spark control.

A third embodiment of the present invention will now be described in connection with FIG. 5. As shown in FIG. 4b, a spark advance control strategy is associated with the AFR modulation strategy of FIG. 4a to produce the engine torque shown in FIG. 4c. The third embodiment of the present invention coordinates the spark advance strategy with the AFR modulation strategy to ensure that minimal variations in engine torque occur during the storage capacity restoration process.

More specifically, this embodiment utilizes retard from normal maximum brake torque (MBT) spark advance (shown as the left-most dashed line in FIG. 4(b)) during the four rich cylinder events. After the rich to lean transition, spark advance is gradually ramped instead of stepped to normal MBT lean spark (shown as the right-most dashed line). This procedure provides spark compensation to offset the effect of fuel lag caused by engine intake wall wetting and assists in equalizing individual cylinder torque. Because of the commensurate relationship between fueling events (4 rich/12 lean) and the number of engine cylinders (4), a deterministic relationship between transient spark strategy and cylinder fuel injection strategy are established as shown.

Torque variations are further reduced by monitoring the differences in rotational event times for each grouping of injection events, i.e., rich, first lean, second lean, and third lean groups. As shown in FIG. 5, a spark adder 300 is used at block 302 to continuously adjust the spark advance to provide minimal differences in event times among these groups. FIGS. 4(a–c) show the implementation of the total event time for a given AFR grouping of injection events. Control of spark advance and retard are graphically represented by a control connection to a set of spark plugs 304 in combination with a set of intake valves 306 and exhaust valves 308. The spark adder and control strategy as described can be implemented by suitably adapting or programming known control arrangements.

Figure 6A:
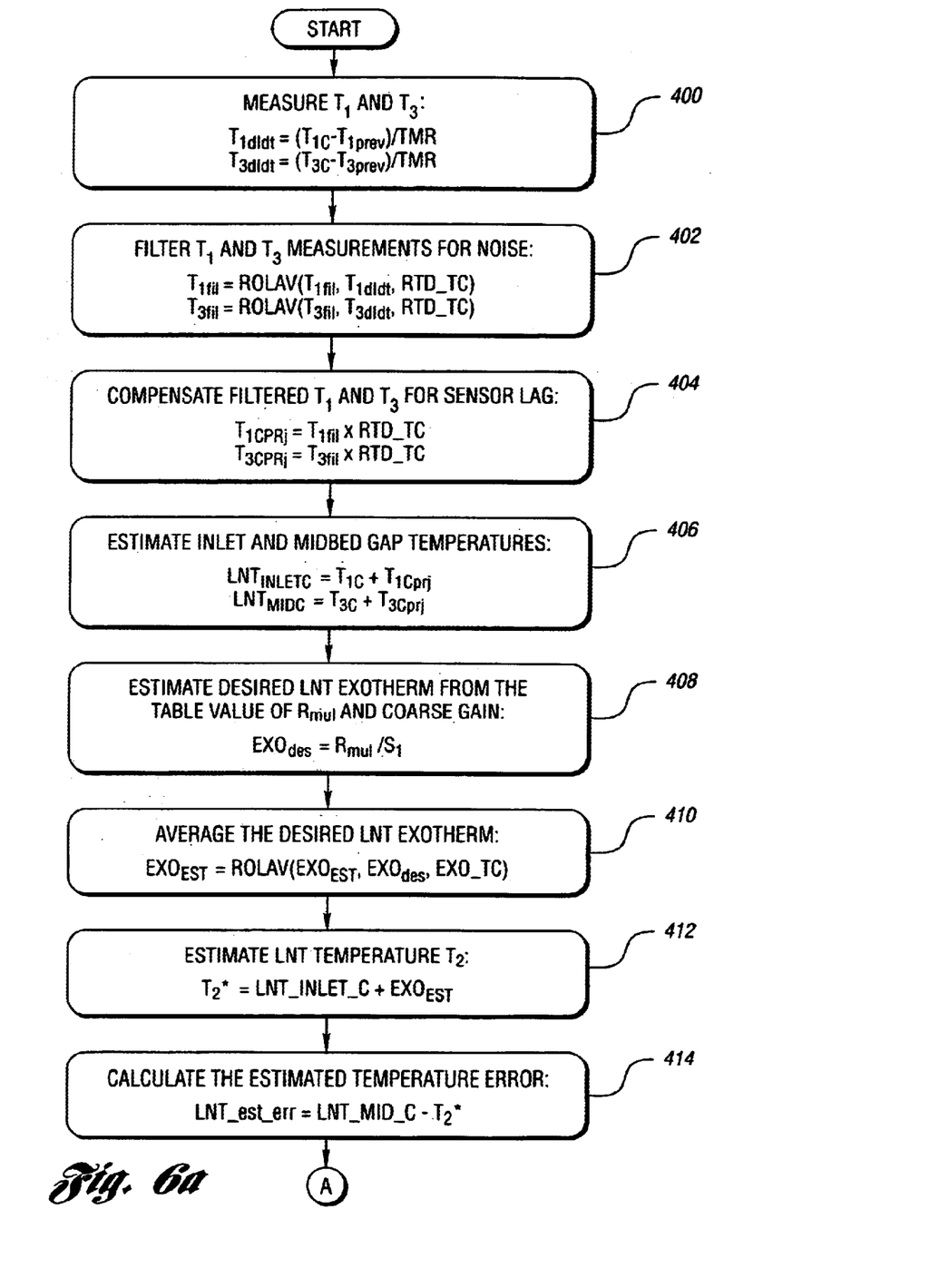
FIGS. 6a and 6b are flowcharts showing the process for estimating actual temperature in accordance with the present invention.
Figure 6B:
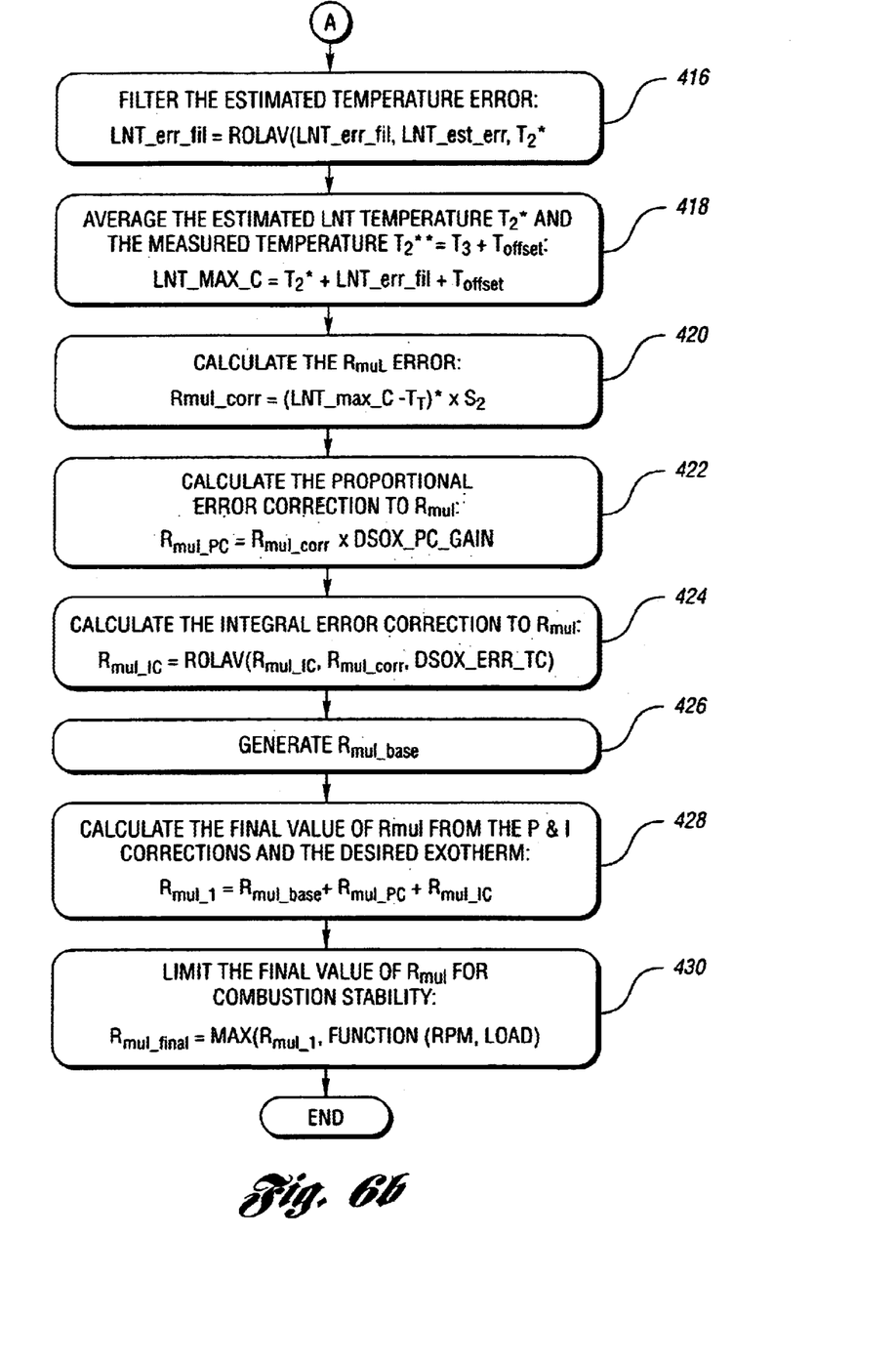

Referring now to FIGS. 6a and 6b, a flowchart is provided to more specifically illustrate operation of the $S_3$ temperature estimator and closed loop control and correction process for $R_{mul}$ in accordance with the present invention. As indicated at block 400, the estimation process begins by determining the change in temperature sensor output measurement per unit time for sensors 36 and 34 (for the embodiment of FIG. 2), or the estimated temperature $T_1^*$ and sensor 34 (for the embodiments of FIGS. 3 and 5). This change is determined based on the difference between a current temperature value sample and the most recent prior sampled value, and dividing by the period of time (TMR) between the two samplings. This process is expressed as follows:

$T_{1dIdT}=(T_{1C}-T_{1prev})/TMR$; and $T_{3dIdT}=(T_{3C}-T_{3prev})/TMR$.

Then, at block 402, the $T_1$ and $T_3$ measurements from block 400 are filtered to remove noise using a rolling average expressed as follows:

$T_{1fil}=ROLAV(T_{1fil}, T_{1dIdT}, RTD\_TC)$; and $T_{3fil}=ROLAV(T_{3fil}, T_{3dIdT}, RTD\_TC)$.

The filtered values for $T_1$ and $T_3$ are then compensated for sensor lag at block 404 by projecting the change in temperature based on the slope for the time constant used to determine the filtered values. This process is expressed as:

$T_{1Cprj}=T_{1fil} \times RTD\_TC$; and $T_{3Cprj}=T_{3fil} \times RTD\_TC$.

The inlet and midbrick gap temperatures are then estimated at block 406 by adding together the current temperature sample and the projected change in temperature as follows:

LNT_INLET_C=$T_{1c}+T_{1Cprj}$; and

LNT_MID_C=$T_{3c}+T_{3Cprj}$.

The next phase of the process is to estimate emission control device exotherm and maximum temperature expected from $R_{mul}$. More specifically, as denoted at block 408, the desired emission control device exotherm is estimated from the table values for $R_{mul}$ and the coarse $S_1$ value $\Delta R_{mul}/\Delta T$, and is expressed as follows:

$EXO_{des}=R_{mul}/S_1$.

The desired value for exotherm is then filtered at block 410 to estimate temperature rise due to $R_{mul}$. The filtering process is a rolling average using a predetermined time constant, and is expressed as follows:

$EXO_{EST}$=ROLAV ($EXO_{EST}$, $EXO_{des}$, EXO_TC).

At block 412, the estimated value for temperature $T_2^*$ is generated by adding the estimated exotherm temperature rise to the projected inlet temperature as follows:

$T_2^*$=LNT_INLET_C+$EXO_{EST}$.

The next portion of the process integrates projected midbed and estimated maximum temperatures. As denoted at block 414, an estimated temperature error is generated by determining the difference between midbed temperature projection and the expected exotherm as follows:

LNT_est_err=LNT_MID_C−$T_2^*$.

This value is then filtered at block 416 using a rolling average and predetermined time constant, and is expressed as:

LNT_err_fil=ROLAV(LNT_err_fil, LNT_est_err, $T_2^*{}_{TC}$).

The measured value $T_3$ is then offset by a value representative of the temperature difference between the estimated location within the emission control device for $T_2$ and the actual location of sensor 34, and the offset $T_3$ value and the estimated value $T_2^*$ are filtered at block 418. The filtering process is expressed as:

LNT_MAX_C=$T_2^*$+LNT_err_fil+$T_{offset}$.

As the temperature error goes to zero, LNT_MAX_C approaches LNT_MID_C+$T_{offset}$.

The next portion of the process determines proportional and integrated corrections for $R_{mul}$. As denoted at block 420, a total $R_{MUL}$ error correction is determined using an $S_2$ value for fine sensitivity at the target emission control device temperature $T_2$, and is expressed as follows:

$R_{mul\_corr}$=(LNT_MAX_C−$T_T$)*$S_2$.

Then, at block 422, a gain value is used to determine a proportional correction value $R_{mul\_PC}$ as follows:

$R_{mul\_PC}$=$R_{mul\_corr}$×DSOX_PC_GAIN.

At block 424, a rolling average is used in combination with a predetermined time constant to determine an integral error correction value $R_{mul\_IC}$ as follows:

$R_{mul\_IC}$=ROLAV($R_{mul\_IC}$, $R_{mul\_corr}$, DSOX_ERR_TC).

The final portion of the process determines the value for $R_{mul\_final}$. The required exotherm is calculated as follows:

DSOX_EXO_RQD=$T_T$−LNT_INLET_C.

$R_{mul\_base}$ is then generated at block 426 using the coarse sensitivity value $S_1$. The proportional and integral corrections are added at block 428 to produce $R_{mul\_1}$. This is expressed as:

$R_{mul\_1}$=$R_{mul\_base}$+$R_{MUL\_PC+RMUL\_IC}$.

Finally, this value is limited at block 430 to produce combustion stability as follows:

$R_{mul\_final}$=maximum($R_{mul\_1}$, function (RPM, LOAD)).

It is noted that the present invention is equally applicable to other control arrangements and exhaust system configurations. For example, in applying the control strategy of the present invention to a split exhaust arrangement, the span of AFR, i.e., the difference in AFR between the set of lean cylinders and the set of rich cylinders ($AFR_{span}$=$AFR_{lean}$−$AFR_{rich}$), is used as the basic control parameter to control heating and exotherm generation in the emission control device.

Therefore, use of the closed-loop temperature control arrangement of the present invention advantageously ensures that the temperature generated in the emission control device during an attempt to restore storage capacity is tightly controlled. Since a vehicle is normally operated across a range of different conditions, such as vehicle accelerations, steady cruises, and decelerations, the control system of the present invention will precisely and dynamically control the temperature within the emission control device to maintain the desired temperature or temperature range. For example, the present control arrangement can prevent temperatures from both exceeding 700° C. and falling below 600° C.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. A system for controlling the temperature within an emission control device, the emission control device having a catalyst bed for reducing emissions of a constituent gas in an exhaust system of a multi-cylinder engine, wherein the catalyst bed has a predetermined light-off temperature, said system comprising:

a first temperature sensor connected to the emission control device to generate an output representative of a first temperature within the emission control device;

a control processor coupled to a fuel control subsystem and arranged to estimate a peak temperature within the catalyst bed based on the output of the first temperature sensor, to compare the estimated peak temperature with a desired temperature that is substantially greater than the predetermined light-off temperature, and to control the air-fuel ratio as a function the comparison to control the peak temperature within the emission control device, wherein the control processor is further arranged to sequentially modulate the air-fuel ratio generated by the fuel injection subsystem as a sequence of operating each cylinder of the multi-cylinder engine at least once with rich fuel pulses and then operating each cylinder of the engine at least once with lean fuel pulses to produce an exotherm for raising the peak temperature within the emission control device, and a spark adder arranged to retard an engine spark during the rich fuel pulse sequences, and gradually ramp to a desired lean spark advance when transitioning from a rich to a lean fuel pulse sequence.

2. The system of claim 1 wherein said first temperature sensor is positioned between two separate catalyst beds within the emission control device.

3. The system of claim 1 wherein the emission control device is connected to a split exhaust pipe configuration where one set of engine cylinders connected to one of the exhaust pipe legs is operated with a lean air-fuel ratio and another set of engine cylinders connected to the other exhaust pipe leg are operated with a rich air-fuel ratio, and the control processor is further arranged to control the difference in air-fuel ratio between the set of lean cylinders and the set of rich cylinders to produce an exotherm for raising the temperature within the emission control device.

4. The system of claim 1 wherein the control processor is arranged to generate an air-fuel correction value as a rich pulse multiplier and a lean pulse modifier to adjust a base value for rich pulse and lean pulse control.

5. The system of claim 1 further comprising a means for generating a value representative of an exhaust system temperature.

6. The system of claim 5 wherein the means for generating the value representative of an exhaust system temperature comprises a temperature model arranged to estimate inlet temperature as a function of engine load and speed.

7. The system of claim 1 wherein the control processor is arranged to generate an asymmetrical modulation sequence.

8. The system of claim 7 wherein the control processor is arranged to generate an air-fuel correction value as a rich pulse multiplier and lean pulse modifier which are used to adjust a base value for rich pulse and lean pulse control, wherein the asymmetrical modulation sequence is formed from a rich pulse multiplier and a lean pulse multiplier having a relationship of $R_{mul}=3*(1-L_{mul})$.

9. A method for controlling temperature within an emission control device, the device having a catalyst bed for reducing emission of a constituent gas in an exhaust system of a multi-cylinder engine having a predetermined number of engine cylinders, the method comprising:

determining an estimate of emission control device temperature at the catalyst bed based on an engine operating parameter;

operating each cylinder of the engine at a rich of stoichiometry air-fuel ratio for a first number of injections that is at least one, said rich air-fuel ratio based on said estimated temperature; and after said operation, operating each cylinder of the engine at a lean of stoichiometry air-fuel ratio for a second number of injections that is more than said first number, said lean air-fuel ratio based on said estimated temperature, said rich and lean combustion operating to increase temperature of the catalyst bed.

10. The method recited in claim 9 wherein ignition timing during said lean operation is less retarded than ignition timing during said rich operation.

11. The method recited in claim 10 wherein said ignition timing is gradually adjusted between said lean ignition timing and said rich ignition timing.

12. A method for controlling temperature within an emission control device, the device having a catalyst bed for reducing emission of a constituent gas in an exhaust system of a multi-cylinder engine having a predetermined number of engine cylinders, the method comprising:

determining an estimate of emission control device temperature at the catalyst bed based on an engine operating parameter;

operating the engine at a rich of stoichiometry air-fuel ratio for a first number of rich fuel injections with a retarded ignition timing, said first number of rich fuel injections commensurate with the predetermined number of engine cylinders and said rich air-fuel ratio based on said estimated temperature; and after said first number of fuel injections, operating the engine at a lean of stoichiometry air-fuel ratio for a second number of lean fuel injection with less retarded ignition timing, said second number of lean fuel injections commensurate with the predetermined number of engine cylinders and said lean air-fuel ratio based on said estimated temperature, and said second number of lean injections being greater than said first number of rich injections.

13. The method recited in claim 12 wherein said number of engine cylinders is four, said first number is 4, and said second number is 12.

14. The method recited in claim 12 wherein said less retarded ignition timing is gradually ramped from a more retarded timing to a less retarded timing.

15. The method recited in claim 12 further comprising measuring temperature of exhaust gasses in the engine exhaust, and said determining said estimate of emission control device temperature at the catalyst bed further comprising determining said estimate based on said measured temperature.

* * * * *